(12) United States Patent
Yan

(10) Patent No.: US 8,935,409 B2
(45) Date of Patent: Jan. 13, 2015

(54) METHOD FOR CONTROLLING FLOW IN A STACK SYSTEM AND CHASSIS SWITCH IN A STACK SYSTEM

(75) Inventor: Dehan Yan, Beijing (CN)

(73) Assignee: Hangzhou H3C Technologies Co., Ltd., Zhejiang (CN)

( * ) Notice: Subject to any disclaimer, the term of this patent is extended or adjusted under 35 U.S.C. 154(b) by 356 days.

(21) Appl. No.: 13/387,334

(22) PCT Filed: Jan. 20, 2011

(86) PCT No.: PCT/CN2011/070429
§ 371 (c)(1),
(2), (4) Date: Jan. 26, 2012

(87) PCT Pub. No.: WO2011/088794
PCT Pub. Date: Jul. 28, 2011

(65) Prior Publication Data
US 2012/0131123 A1    May 24, 2012

(30) Foreign Application Priority Data
Jan. 20, 2010   (CN) .......................... 2010 1 0004299

(51) Int. Cl.
G06F 15/16   (2006.01)
H04L 12/939   (2013.01)
H04L 12/801   (2013.01)

(52) U.S. Cl.
CPC ................ H04L 49/55 (2013.01); H04L 47/10 (2013.01)
USPC ....................................................... 709/227

(58) Field of Classification Search
CPC ..... H04L 43/0811; H04L 69/40; H04L 47/10; H04L 659/40; H04L 41/0668; H04L 41/0677
USPC .......................................................... 709/227
See application file for complete search history.

(56) References Cited

U.S. PATENT DOCUMENTS

| | | | |
|---|---|---|---|
| 6,785,272 B1 * | 8/2004 | Sugihara | 370/386 |
| 6,898,727 B1 * | 5/2005 | Wang et al. | 714/4.3 |
| 7,782,800 B2 * | 8/2010 | Swain | 370/257 |
| 8,300,523 B2 * | 10/2012 | Salam et al. | 370/220 |
| 2004/0085894 A1 | 5/2004 | Wang et al. | |

(Continued)

FOREIGN PATENT DOCUMENTS

CN          1527547 A        9/2004
WO    WO-2007002875 A1     1/2007

OTHER PUBLICATIONS

Zhu, Peidong, High Performance Router, The People's Post and Telecommunication Press, Dec. 2005, pp. 19-40, ISBN 7-115-13775-7.

(Continued)

Primary Examiner — Larry Donaghue

(57) ABSTRACT

A method for controlling flow and a chassis switch in a stack system are provided. The stack system includes multiple chassis, each of the multiple chassis includes a main control board and an interface board, traffic flow and control flow in each of the multiple chassis are independent of each other when each of the multiple chassis operates normally. In the method, when a main control board in a chassis in the stack system is unavailable, control flow to be transferred to a destination interface board is switched to a traffic flow channel corresponding to the destination interface board from a control flow channel, and the control flow is transmitted to the destination interface board through the traffic flow channel.

6 Claims, 7 Drawing Sheets

(56) References Cited

U.S. PATENT DOCUMENTS

| | | | |
|---|---|---|---|
| 2006/0092853 A1* | 5/2006 | Santoso et al. | 370/252 |
| 2008/0205418 A1* | 8/2008 | Rose et al. | 370/401 |
| 2009/0086620 A1* | 4/2009 | Fowler et al. | 370/216 |

OTHER PUBLICATIONS

International Search Report and Written Opinion for PCT Application No. PCT/CN2011/070429, Apr. 28, 2011.

CN First Office Action dated Jun. 18, 2012 issued on CN Patent Application No. 201010004299.X filed on Jan. 20, 2010, The State Intellectual Property Office, the P.R. China.

CN Second Office Action dated Feb. 26, 2013 issued on CN Patent Application No. 201010004299.X filed on Jan. 20, 2010, the State Intellectual Property Office, the P.R. China.

Peidong, Zhu, ""863" Communications High-tech Series: High-performance Router", 2005.

* cited by examiner

FIG. 1 - PRIOR ART

METHOD FOR CONTROLLING FLOW IN A STACK SYSTEM AND CHASSIS SWITCH IN A STACK SYSTEM

CLAIM FOR PRIORITY

The present application is a national stage filing under 35 U.S.C. 371 of PCT application number PCT/CN2011/070429, having an international filing date of Jan. 20, 2011, which claims priority to Chinese Patent Application No. 201010004299.X filed Jan. 20, 2010, which are incorporated by reference in their entireties.

BACKGROUND OF THE INVENTION

A stack system refers to a system consisting of multiple chassis switches (called chassis for short). Each chassis includes a main control board, a switch fabric board and more than one interface board. In the stack system, one chassis is selected as a master according to a preset selection principle, and the other chassis are regarded as slaves.

However, when the main control board in a chassis is unavailable, e.g. replaced or down, data traffic processing in the chassis will be interrupted.

DETAILED DESCRIPTION OF THE INVENTION

Figure 1:
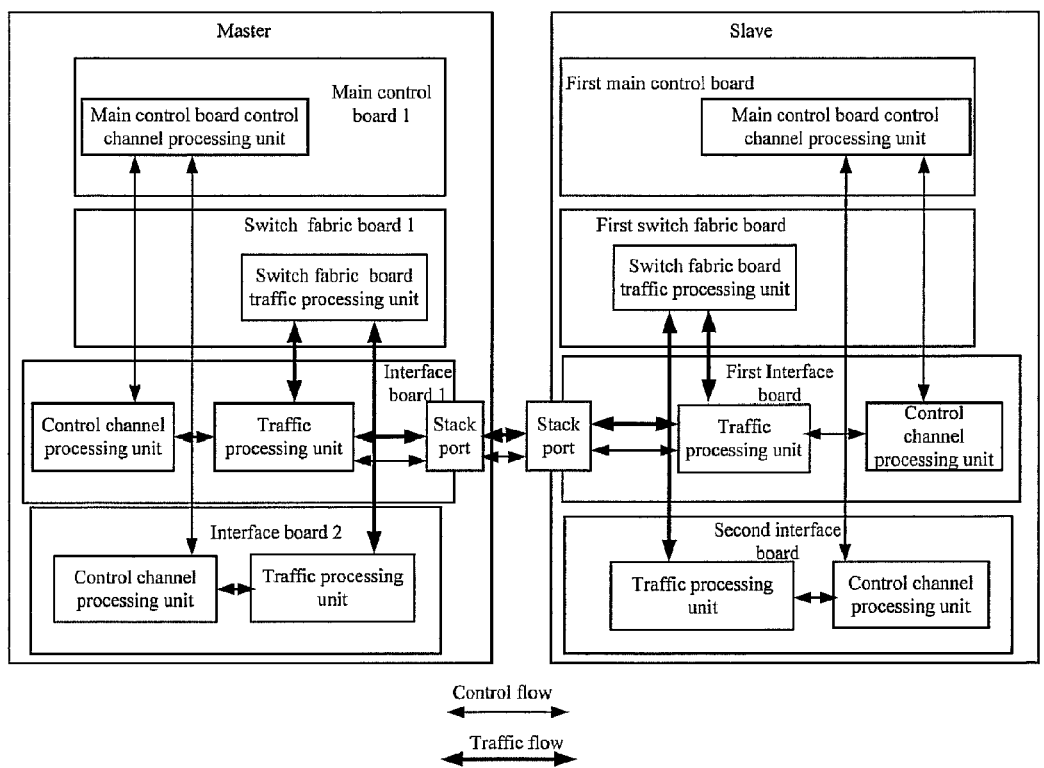
FIG. 1 is a schematic diagram illustrating a structure of a conventional stack system.

FIG. 1 is a schematic diagram illustrating a structure of a conventional stack system. As shown in FIG. 1, the stack system includes two chassis, and each chassis includes one main control board, one switch fabric board and two interface boards; one of the two chassis is selected as a master according to the preset selection principle and the other is regarded as a slave.

The main control board in each chassis includes a main control board control channel processing unit, and the switch fabric board includes a switch fabric board traffic processing unit. Consequently, control flow and traffic flow in each chassis can be independent of each other. Specifically, the traffic flow in the chassis is all processed by the switch fabric board traffic processing unit in the switch fabric board, and the control flow in the chassis is all processed by the main control board traffic processing unit in the main control board.

For description convenience, transmission of the control flow will be described according to an example in which the master includes a main control board 1, a switch fabric board 1 and two interface boards including an interface board 1 and an interface board 2 and in which the slave includes a first main control board, a first switch fabric board and two interface boards including a first interface board and a second interface board. As shown in FIG. 1, suppose the interface board 2 in the master needs to transmit the control flow to the interface board 2 in the master, a control channel processing unit in the interface board 2 first transmits the control flow to the main control board control channel processing unit in the main control board 1, and the main control board control channel processing unit transmits the control flow to a control channel processing unit in the interface board 1.

Thus, the transmission of the control flow within a chassis is finished.

Regarding transmission of the control flow between chassis, it is implemented by a traffic processing unit in an interface board where a shared stack port is located (called stack board). As shown in FIG. 1, suppose the main control board 1 in the master needs to transmit the control flow to the second interface board in the slave, the main control board control channel processing unit first transmits the control flow to a control channel processing unit in the stack board (i.e. the interface board 1 in FIG. 1). Next, the control channel processing unit in the stack board transmits the control flow to the traffic processing unit in the stack board. Then, the traffic processing unit in the stack board in the master transmits the control flow to a traffic processing unit in a stack board in the slave (i.e. the first interface board in the slave in FIG. 1) via the stack port in the master and the stack port in the slave. The traffic processing unit in the stack board in the slave further transmits the control flow to the control channel processing unit in the stack board in the slave. As the destination of the control flow is another interface board in the slave, when receiving the control flow, the control channel processing unit in the stack board in the slave further transmits the control flow to the main control board control channel processing unit in the first main control board in the slave, which then transmits the control flow to the control channel processing unit in the second interface board in the slave.

Thus, the transmission of the control flow between chassis is finished.

Figure 2:
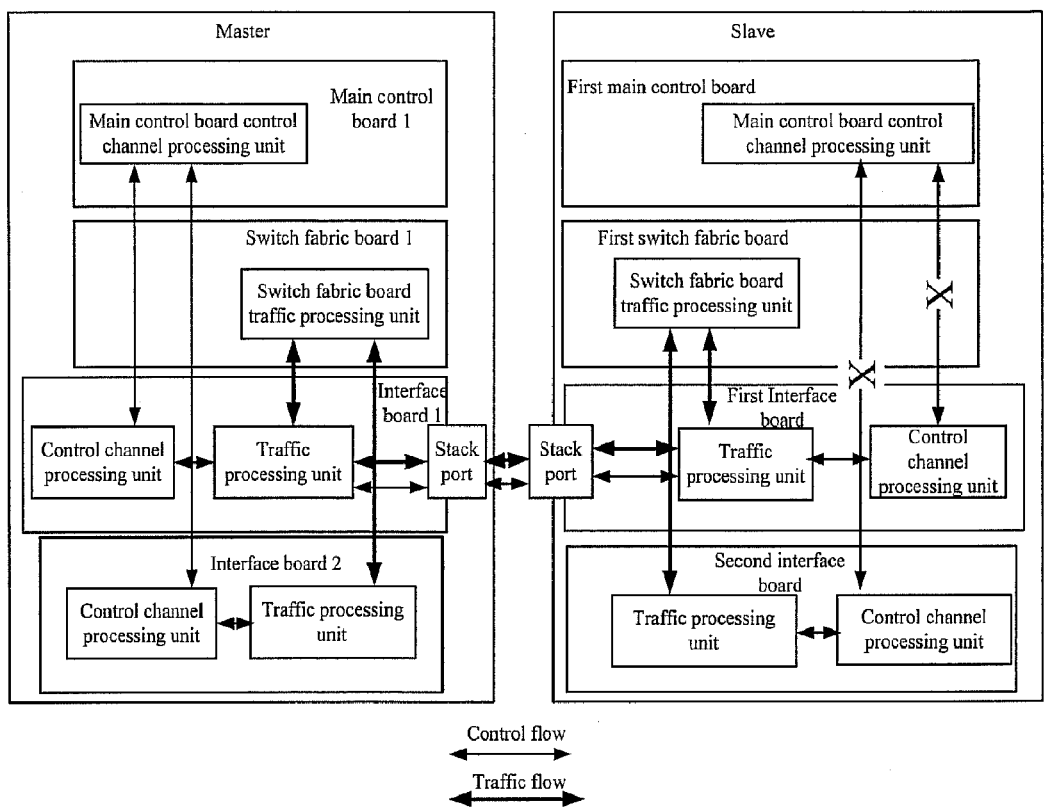
FIG. 2 is a schematic diagram illustrating a situation in which a main control board in a slave in a stack system is unavailable.

As can be seen from the above description, when the main control board in a chassis such as the slave in FIG. 2 is unavailable, e.g. replaced or down, data traffic processing in the chassis will be interrupted.

In view of above, one aspect provides a method for controlling flow in a stack system, which is applied to the stack system including more than one chassis. In the method, when all chassis in the stack system operate normally, traffic flow and control flow in each of the chassis are independent of each other. When a main control board in a chassis in the stack system is unavailable, e.g. replaced or down, the method includes steps of: switching control flow to be transferred to a destination interface board to a traffic flow channel corresponding to the destination interface board from a control flow channel, and transmitting the control flow to the destination interface board through the traffic flow channel. In some implementations, this method may help to minimize or even eliminate interruptions in processing the traffic flow.

In an example, each chassis may include a switch fabric board adapted to process the traffic flow in the chassis, wherein the control flow is to be transferred by a first interface board in the chassis. The first interface board includes a traffic processing unit adapted to process the traffic flow received, and a control channel processing unit adapted to process the control flow received.

When the first interface board is an interface board without a stack port, the step of switching the control flow to the traffic flow channel corresponding to the destination interface board from the control flow channel may be as follows:

when receiving the control flow from the control channel processing unit, the traffic processing unit on the first interface board transfers the control flow to the switch fabric board through a traffic flow control channel between the traffic processing unit and the switch fabric board, and when receiving the control flow, the switch fabric board transmits the control flow to the destination interface board through a traffic flow channel between the switch fabric board and the destination interface board; or, when receiving the control flow from the switch fabric board, the traffic processing unit on the first interface board transmits the control flow to the control channel processing unit.

In an example, when the first interface board is an interface board having a stack port, the step of switching the control flow to the traffic flow channel corresponding to the destination interface board from the control flow channel may be as follows:

the traffic processing unit switches, according to destination address information contained in the control flow, the control flow to be transferred to the destination interface board to the traffic flow channel corresponding to the destination interface board from the control flow channel.

In an example, the above step of switching, by the service processing unit according to the destination address information contained in the control flow, the control flow to the traffic flow channel corresponding to the destination interface board from the control flow channel may include be as follows:

if the destination address information is an address of the first interface board, the traffic processing unit on the first interface board receives the control flow via the stack port or the switch fabric board, and transmits the control flow to the control channel processing unit on the first interface board;

if the destination address information is an address of an interface board other than the first interface board in the chassis, the traffic processing unit on the first interface board receives the control flow via the control channel processing unit or the stack port, and transmits the control flow to the switch fabric board through a traffic flow channel between the first interface board and the switch fabric board; the switch fabric board then transmits the control flow to the destination interface board through a traffic flow channel between the switch fabric board and the destination interface board;

if the destination address information is an address of an interface board in another chassis, the traffic processing unit on the first interface board receives the control flow via the control channel processing unit or the switch fabric board, and transmits the control flow to the destination interface board via the stack port through a traffic flow channel between the traffic processing unit and the destination interface board.

To make technical schemes clearer, several examples are described below in detail with reference to accompanying drawings.

Figure 3A:
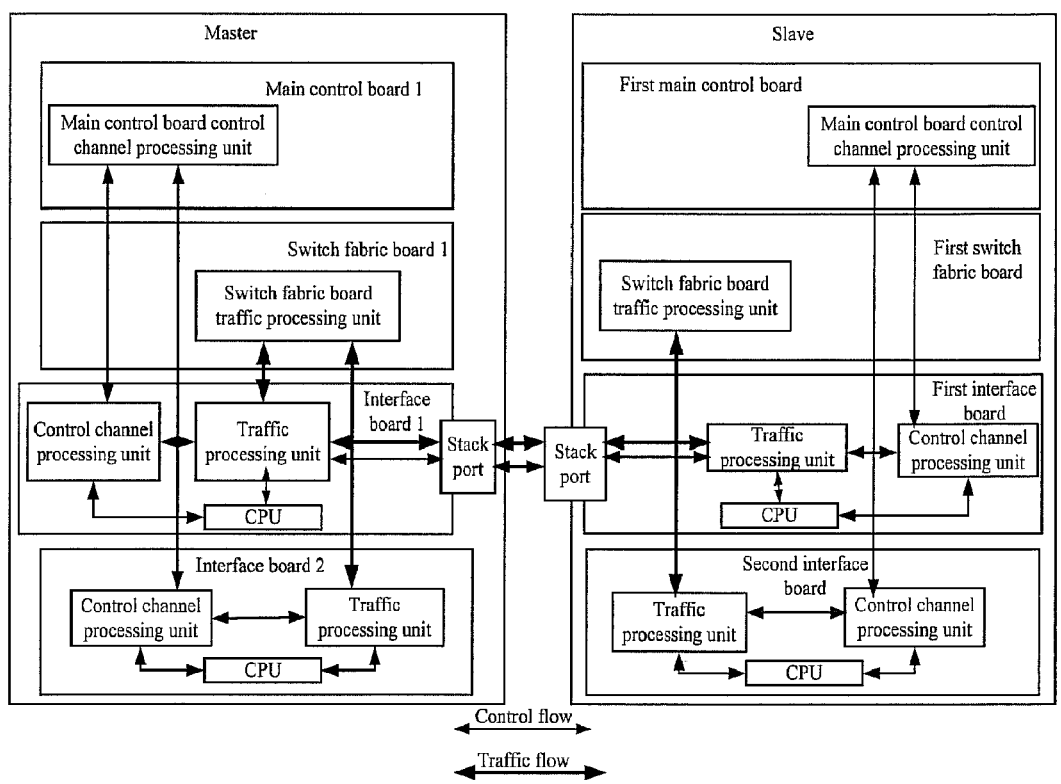
FIG. 3a is a schematic diagram illustrating a situation in which a main control board in a slave in a stack system is unavailable.

A stack system shown in FIG. 3a is taken as an example. As shown in FIG. 3a, the stack system includes two chassis, each of which includes a main control board, a switch fabric board and more than one interface board, e.g. two interface boards in this example. The main control board mainly includes a main control board control channel processing unit; the interface board mainly includes a traffic processing unit and a control channel processing unit; the switch fabric board mainly includes a switch fabric board traffic processing unit. One of the chassis in the stack system shown in FIG. 3a is selected as a master according to a preset selection principle, and the other of the chassis is taken as a slave. In the stack system shown in FIG. 3a, when all boards in the master or the slave operate normally, the traffic flow and the control flow in the master or the slave are independent of each other, However, when the main control board in the master or the slave shown in FIG. 3a is unavailable, e.g. replaced or down, the following procedure is provided so as to ensure that the traffic is uninterrupted.

In order to conveniently differentiate all boards in the master and the slave, it is supposed that the master shown in FIG. 3a includes a main control board 1, a switch fabric board 1 and two interface boards which are an interface board 1 and an interface board 2 respectively, and it is further supposed that the slave includes a first main control board, a first switch fabric board and two interface boards which are a first interface board and a second interface board respectively. When the first main control board in the slave shown in FIG. 3a is unavailable, e.g. replaced or down, a transmission procedure of the control flow within the slave may includes steps of:

Step 301b: The second interface board shown in FIG. 3a detects that the first main control board is replaced or down currently, and then step 302b is performed.

In this step 301b, the second interface board may detect the first main control board according to the conventional art, which will not be described herein.

It should be noted that, for description convenience, the second interface board in the slave is taken as an example to detect the first main control board in the slave, while other boards such as the first interface board can also perform the same as the second interface board, which will not be described again herein.

Step 302b: If a control channel processing unit on the second interface board needs to transfer control flow to a control channel processing unit on the first interface board, step 303b is performed.

In step 302b, the first interface board is a destination interface board of the control flow transferred by the control channel processing unit on the second interface board. To facilitate transmission of the control flow, the control flow transferred by the control channel processing unit on the second interface board may contain destination address information, such as an IP address or slot information of the destination interface board (which is the first interface board in this example).

Step 303b: The control channel processing unit on the second interface board transmits the control flow to the traffic processing unit on the second interface board, and the traffic processing unit on the second interface board transfers the control flow to the switch fabric board traffic processing unit on the first switch fabric board through a traffic flow channel between the traffic processing unit on the second interface board and the switch fabric board traffic processing unit on the first switch fabric board.

In this step, besides the traffic processing unit and the control channel processing unit, each interface board may further includes a control unit, such as CPU, which is shown in FIG. 3a. The CPU on each interface board is adapted to control the control channel processing unit and the traffic processing unit which are on the same interface board as the CPU. In view of this, in step 303b, the control channel processing unit on the second interface board is controlled by the CPU on the second interface board to transmit the control flow to the traffic processing unit on the second interface board.

Step 304b: The switch fabric board traffic processing unit transmits the control flow received to the traffic processing unit on the destination interface board (the first interface board in this example) through a traffic flow channel between the switch fabric board traffic processing unit and the traffic processing unit on the destination interface board.

By step 304*b*, the traffic processing unit on the destination interface board has received the control flow, determines that the destination address information contained in the control flow is an address of this board and performs step 305*b*.

Step 305*b*: The traffic processing unit on the destination interface board transmits the control flow to the control channel processing unit on the destination interface board.

By step 305*b*, the control channel processing unit on the destination interface board has received the control flow destining for the control channel processing unit on the destination interface board.

Figure 3B:
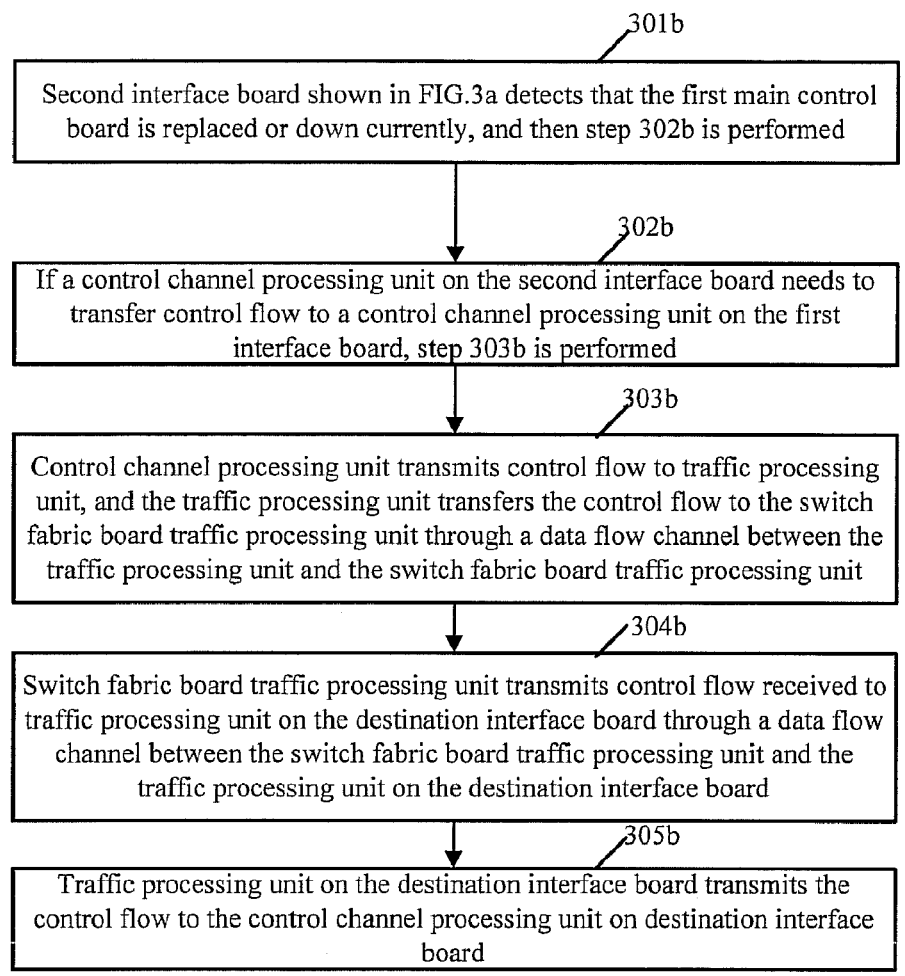
FIG. 3b is a flowchart according to an example.

It should be noted that, the foregoing describes the transmission of the control flow within the slave in the case that the first main control board in the slave is replaced or down. When the main control board 1 in the master is replaced or down, the transmission of the control flow within the master is similar to that shown in FIG. 3*b*, and will not be described in detail again.

The foregoing describes the transmission of the control flow within a chassis in the case that the main control board in the chassis is replaced or down. When the main control board in one chassis is replaced or down, if another chassis needs to transmit the control flow to the chassis, the following procedure is provided to ensure traffic uninterrupted.

Figure 3C:
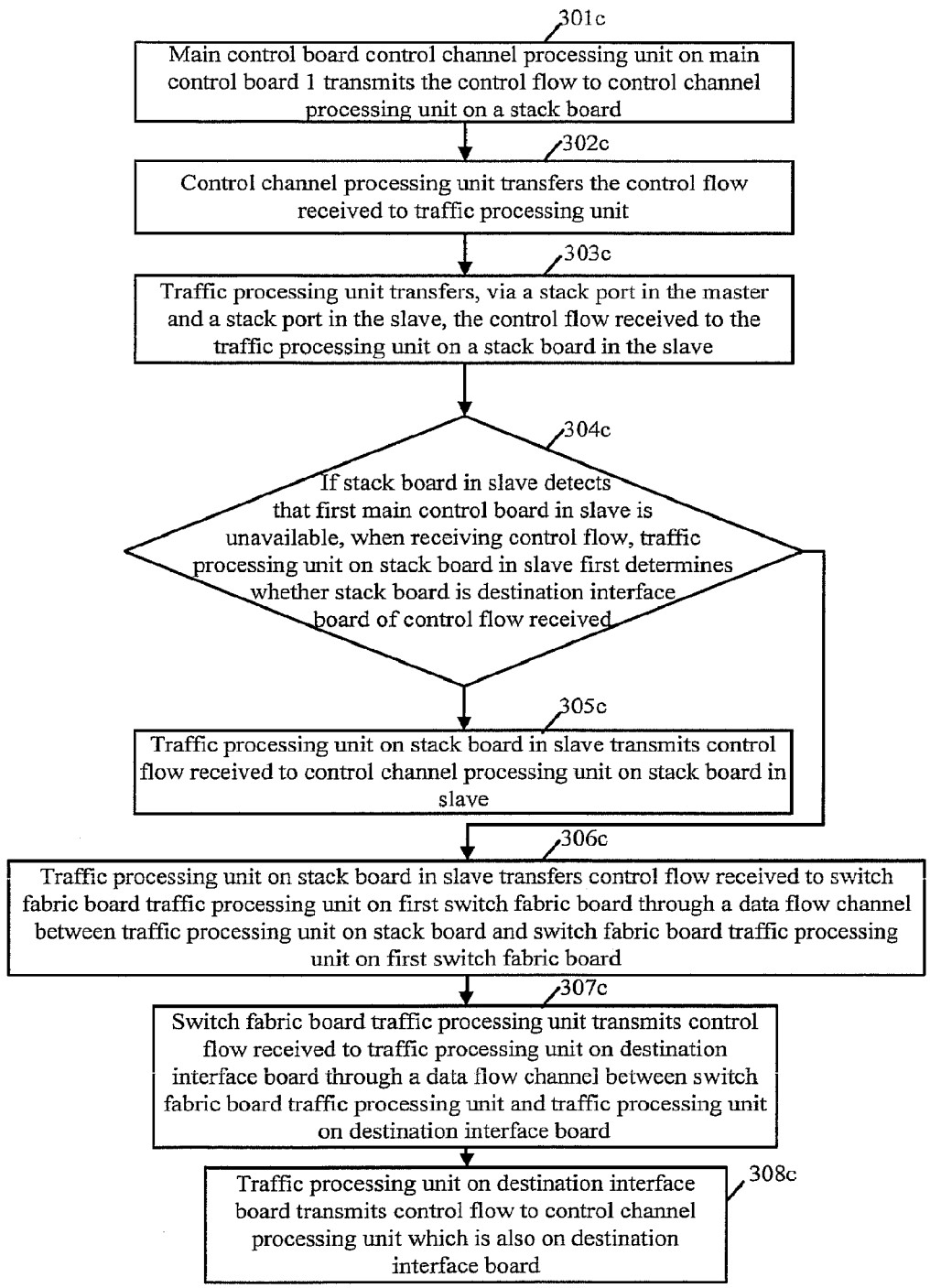
FIG. 3c is a flowchart according to another example.

Still take the case that the first main control board on the slave shown in FIG. 3*a* is unavailable as an example. When the main control board 1 in the master needs to transmit the control flow to the second interface board in the slave, the procedure may includes the following steps as shown in FIG. 3*c*.

Step 301*c*: The main control board control channel processing unit on the main control board 1 transmits the control flow to the control channel processing unit on a stack board, i.e., the interface board 1 shown in FIG. 3*a*.

Step 302*c*: The control channel processing unit on the interface board 1 transfers the control flow received to the traffic processing unit which is also on the interface board 1.

Step 303*c*: The traffic processing unit transfers, via a stack port in the master and a stack port in the slave, the control flow received to the traffic processing unit on a stack board (i.e. the first interface board shown in FIG. 3*a* in this example) in the slave.

Operations in Steps 301*c* to 303*c* are similar to conventional operations of control flow transmission between chassis.

Step 304*c*: If the stack board in the slave detects that the first main control board in the slave is replaced or down, when receiving the control flow, the traffic processing unit on the stack board in the slave first determines whether the stack board is the destination interface board of the control flow received. If the stack board is the destination interface board of the control flow received, step 305*c* is performed; otherwise, step 306*c* is performed.

The determining in step 304*c* includes: the traffic processing unit on the stack board in the slave determines whether the destination address information contained in the control flow is information of the stack board; if the destination address information contained in the control flow is information of the stack board, it determines that the stack board is the destination interface board of the control flow; otherwise, it determines that the stack board is not the destination interface board of the control flow.

Step 305*c*: The traffic processing unit on the stack board in the slave transmits the control flow received to the control channel processing unit on the stack board in the slave. By step 305*c*, the operations of control flow transmission between chassis are implemented, and the current procedure is terminated.

Step 306*c*: The traffic processing unit on the stack board in the slave transfers the control flow received to the switch fabric board service processing unit on the first switch fabric board through a traffic flow channel between the traffic processing unit on the stack board and the switch fabric board service processing unit on the first switch fabric board.

Step 307*c*: The switch fabric board traffic processing unit transmits the control flow received to the traffic processing unit on the destination interface board through a traffic flow channel between the switch fabric board traffic processing unit and the traffic processing unit on the destination interface board.

Step 308*c*: The traffic processing unit on the destination interface board transmits the control flow to the control channel processing unit which is also on the destination interface board.

By step 308*c*, the operations of control flow transmission between chassis are implemented and the current procedure is thus terminated.

It can be seen from the above description that the CPU on each interface board is adapted to control the control channel processing unit and the traffic processing unit which are on the same interface board as the CPU. In view of this, the CUP on the stack board is adapted to control the operations in step 305*c*, i.e. control the traffic processing unit on the stack board to transmit the control flow received to the control channel processing unit on the stack board and control the control channel processing unit on the stack board to transmit the control flow to the switch fabric board traffic processing unit on the first switch fabric board.

Figure 3D:
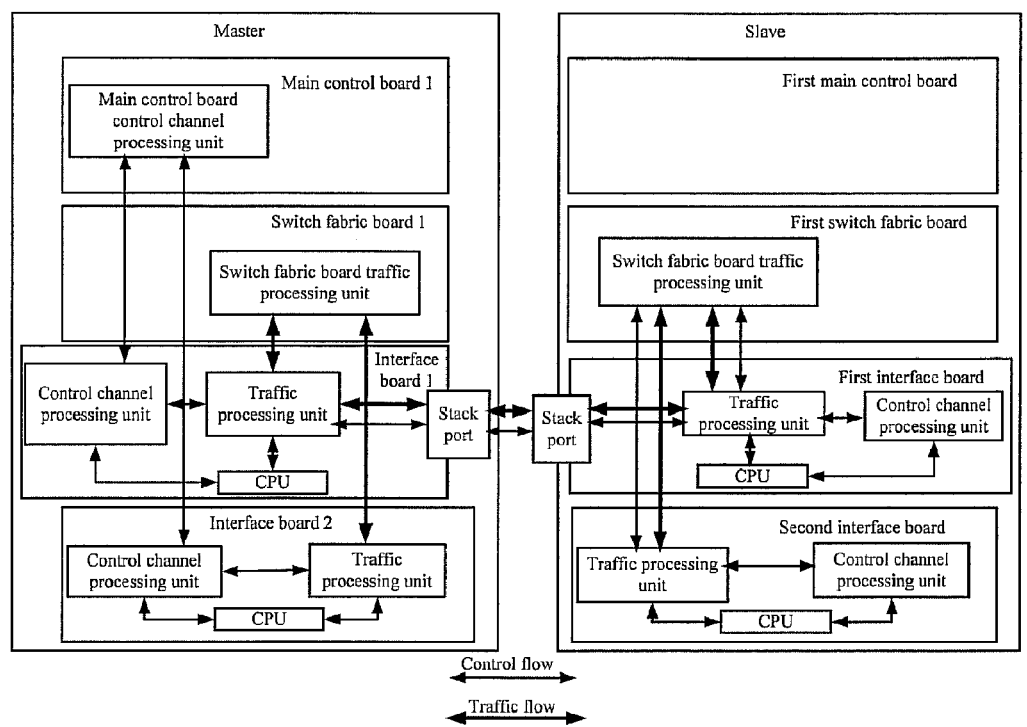
FIG. 3d is a schematic diagram illustrating a structure of a stack system corresponding to a method provided by an example.

FIG. 3*d* is a schematic diagram illustrating a structure of a stack system corresponding to a method provided by an example. As shown in FIG. 3*d*, when the first main control board in the slave in the stack system is unavailable, e.g. replaced or down, the control flow between the master and the slave as well as the control flow within the slave can be transmitted via the switch network board through a traffic flow channel. As such, traffic flow interruption caused by conventional control flow interruption in the case that the main control board is replaced or down can be avoided, and thus traffic in the chassis will not be interrupted.

When the unavailable main control board is successfully replaced or restarted, the method may further include: reusing the control flow channel used before the main control board is unavailable, and transmitting the control flow in the chassis through the control flow which is reused. Specifically, the control flow transmission shown in FIG. 3*d* is changed to the control flow transmission shown in FIG. 3*a*. It should be noted that the reusing operation can be implemented by the CPU on each board.

In addition, an apparatus will be described below according to examples.

Figure 4:
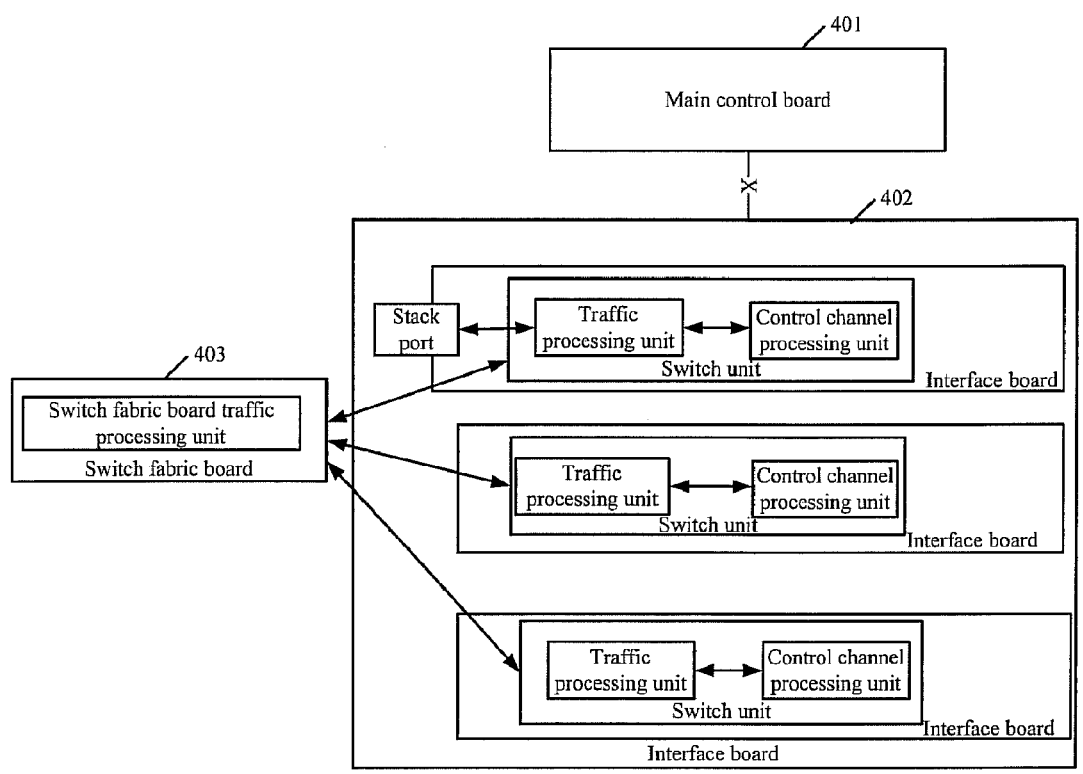
FIG. 4 is a schematic diagram illustrating a structure of a chassis switch provided by an example.

FIG. 4 is a schematic diagram illustrating a structure of a chassis switch provided by an example. As shown in FIG. 4, the chassis may include a main control board 401 and interface boards 402. When all boards in the chassis operate normally, traffic flow and control flow in the chassis switch are independent of each other. Each interface board 402 includes a switch unit. When detecting that the main control board 401 is unavailable such as replaced or down, the switch unit switches control flow which will be transferred by the main control board to a destination interface board to a traffic flow channel corresponding to the destination interface board from a control flow channel, and transmits the control flow to the destination interface board through the traffic flow channel.

Preferably, as shown in FIG. 4, the chassis switch may further include a switch fabric board 403 adapted to process traffic flow, and the switch unit includes a traffic processing unit adapted to process the traffic flow and a control channel processing unit adapted to process the control flow.

When the control channel processing unit on an interface board needs to transfer the control flow to the destination interface board, it first transfers the control flow to the traffic processing unit on the same interface board, which then transmits the control flow to the switch fabric board 403;

When receiving the control flow, the switch fabric board 403 transmits the control flow to the destination interface board through a traffic flow channel between the switch fabric board 403 and the destination interface board.

As shown in FIG. 4, the chassis switch further includes a stack port adapted to implement interaction of traffic flow and control between the chassis switch and other chassis switches. The stack port is on at least one interface board, while FIG. 4 illustrates an example that the stack port is on one interface board.

When receiving the control flow transmitted by the main control board in a master via the stack port, the traffic processing unit determines whether the interface board where the the traffic processing unit is located is the destination interface board of the control flow according to destination address information contained in the control flow, and if the interface board is not the destination interface board of the control flow, transfers the control flow to the switch fabric board 403 through the traffic flow channel between the traffic processing unit and the switch fabric board 403. And then the switch fabric board 403 transmits the control flow to the destination interface board through the traffic flow channel between the switch fabric board 403 and the destination interface board. If the interface board is the destination interface board of the control flow, the traffic processing unit transmits the control flow received to the control channel processing unit on the same interface board as the traffic processing unit.

Preferably, the switch fabric board 403 transmits the control flow to the traffic processing unit on the destination interface board through the traffic flow channel between the switch fabric board 403 and the traffic processing unit on the destination interface board. When receiving the control flow, the traffic processing unit on the destination interface board transmits the control flow to the control channel processing unit on the destination interface board.

As shown in FIG. 4, the switch fabric board 403 may include a switch fabric board traffic processing unit, adapted to perform the operation of transmitting the control flow to the traffic processing unit on the destination interface board through the traffic flow channel between the switch fabric board 403 and the traffic processing unit on the destination interface board.

As can be seen from the above technical scheme, when the main control board in the chassis in the stack system is unavailable, the control flow to be transferred from the main control board to the destination interface board is switched to the traffic flow channel corresponding to the destination interface board, This has the advantage that the date flow is not directly interrupted. Therefore, in most cases the control flow will not be interrupted when the main control board is unavailable and thus the traffic in the chassis will not be interrupted.

The foregoing is only examples. The protection scope, however, is not limited to the above description. Any change or substitution, easily occurring to those skilled in the art, should be covered by the protection scope.

What is claimed is:

1. A method for controlling flow in a stack system, wherein the stack system comprises multiple chassis, each of the multiple chassis comprises a main control board to process a control flow, a switch fabric board to process a traffic flow, and a first interface board, wherein the traffic flow and the control flow in each of the multiple chassis are independent of each other when each of the multiple chassis operates normally, the method comprising:

when a main control board in a chassis in the stack system is unavailable, switching the control flow to be transferred to a destination interface board from a control flow channel to a traffic flow channel corresponding to the destination interface board via the switch fabric board, and transmitting the control flow to the destination interface board through the traffic flow channel via the switch fabric board, wherein the control flow is to be transferred by the first interface board in the chassis, and the first interface board comprises a traffic processing unit to process the traffic flow and a control channel processing unit to process the control flow, when the first interface board is an interface board without a stack port, the switching of the control flow from the control flow channel to the traffic flow channel corresponding to the destination interface board comprises:

when receiving the control flow from the control channel processing unit, transferring, by the traffic processing unit on the first interface board, the control flow to the switch fabric board through a traffic flow channel between the traffic processing unit on the first interface board and the switch fabric board, and after receiving the control flow, transmitting, by the switch fabric board, the control flow to the destination interface board through a traffic flow channel between the switch fabric board and the destination interface board; or when receiving the control flow from the switch fabric board, transmitting, by the traffic processing unit on the first interface board, the control flow to the control channel processing unit.

2. A method for controlling flow in a stack system, wherein the stack system comprises multiple chassis, each of the multiple chassis comprises a main control board to process a control flow, a switch fabric board to process a traffic flow, and a first interface board, wherein the traffic flow and the control flow in each of the multiple chassis are independent of each other when each of the multiple chassis operates normally, the method comprising:

when a main control board in a chassis in the stack system is unavailable, switching the control flow to be transferred to a destination interface board from a control flow channel to a traffic flow channel corresponding to the destination interface board via the switch fabric board, and transmitting the control flow to the destination interface board through the traffic flow channel via the switch fabric board, wherein the control flow is to be transferred by the first interface board in the chassis, and the first interface board comprises a traffic processing unit to process the traffic flow and a control channel processing unit to process the control flow;

when the first interface board is an interface board having a stack port, the switching of the control flow from the control flow channel to the traffic flow channel corresponding to the destination interface board comprises:
switching, by the traffic processing unit according to destination address information contained in the control flow, the control flow to be transferred to the destination interface board to the traffic flow channel corresponding to the destination interface board from the control flow channel.

3. The method of claim 2, wherein the switching, by the traffic processing unit according to the destination address information contained in the control flow, the control flow to be transferred to the destination interface board to the traffic flow channel corresponding to the destination interface board from the control flow channel comprises:
if the destination address information is an address of the first interface board, receiving, by the traffic processing unit on the first interface board, the control flow via the stack port or the switch fabric board, and transmitting the control flow to the control channel processing unit on the first interface board;
if the destination address information is an address of an interface board other than the first interface board in the chassis, receiving, by the traffic processing unit on the first interface board, the control flow via the control channel processing unit or the stack port, and transmitting the control flow to the switch fabric board through a traffic flow channel between the first interface board and the switch fabric board; transmitting, by the switch fabric board, the control flow to the destination interface board through a traffic flow channel between the switch fabric board and the destination interface board; and
if the destination address information is an address of an interface board in another chassis, receiving, by the traffic processing unit on the first interface board, the control flow via the control channel processing unit or the switch fabric board; and transmitting the control flow to the destination interface board via the stack port through a traffic flow channel between the traffic processing unit and the destination interface board.

4. The method of claim 2, further comprising:
when the main control board becomes available, reusing the control flow channel which is used before the main control board is unavailable, and transmitting the control flow within the chassis through the reused control flow channel.

5. A chassis switch for use in a stack system comprising at least another chassis switch and in which a traffic flow and a control flow are independent of each other when the chassis switch operates normally, the chassis switch comprising:
a main control board to process the control flow, a switch fabric board to process the traffic flow, and multiple interface boards;
wherein each of the multiple interface boards comprises a switch unit to switch, when detecting that the main control board is unavailable, the control flow to be transferred to a destination interface board from a control flow channel to a traffic flow channel corresponding to the destination interface board via the switch fabric board, and transmit the control flow to the destination interface board through the traffic flow channel via the switch fabric board,
wherein the switch unit comprises a traffic processing unit to process the traffic flow, and a control channel processing unit to process the control flow; wherein an interface board without a stack port is to transfer the control flow to be transferred;
wherein the traffic processing unit on the interface board without the stack port is to: receive the control flow from the control channel processing unit and transfer the control flow to the switch fabric board through a traffic flow channel between the traffic processing unit and the switch fabric board, the switch fabric board is then to transmit the control flow to the destination interface board through a traffic flow channel between the switch fabric board and the destination interface board; or
the traffic processing unit on the interface board without the stack port is to: receive the control flow from the switch fabric board and transmit the control flow to the control channel processing unit.

6. A chassis switch for use in a stack system comprising at least another chassis switch and in which a traffic flow and a control flow are independent of each other when the chassis switch operates normally, the chassis switch comprising:
a main control board to process the control flow, a switch fabric board to process the traffic flow, and multiple interface boards,
wherein each of the multiple interface boards comprises a switch unit to switch, when detecting that the main control board is unavailable, the control flow to be transferred to a destination interface board from a control flow channel to a traffic flow channel corresponding to the destination interface board via the switch fabric board, and transmit the control flow to the destination interface board through the traffic flow channel via the switch fabric board,
wherein the switch unit comprises a traffic processing unit to process the traffic flow, and a control channel processing unit to process the control flow; wherein an interface board having a stack port is to transfer the control flow to be transferred, the stack port is to implement interaction of the traffic flow and the control flow between the chassis switch and the another chassis switch;
the traffic processing unit is to:
receive the control flow from the control channel processing unit or the stack port or the switch fabric board;
if destination address information contained in the control flow is an address of the interface board where the traffic processing unit is located, transmit the control flow to the control channel processing unit on the same interface board as the traffic processing unit;
if the destination address information contained in the control flow is an address of another interface board within the chassis switch, transfer the control flow to the switch fabric board through a traffic flow channel between the traffic processing unit and the switch fabric board, the switch fabric board is then to transmit the control flow to the destination interface board through a traffic flow channel between the switch fabric board and the destination interface board; and
if the destination address information contained in the control flow is an address of an interface board in another chassis switch, transmit the control flow to the destination interface board via the stack port through a traffic flow channel between the traffic processing unit and the destination interface board.

* * * * *